Feb. 14, 1950 J. D. LANGMAN 2,497,126
ELECTRIC CONDUIT FITTING
Filed Jan. 22, 1948
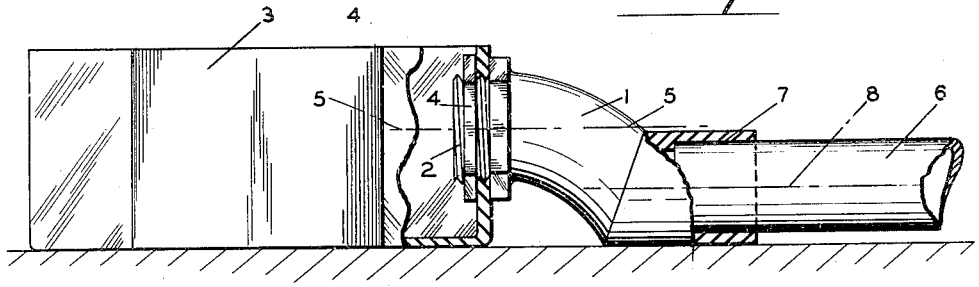
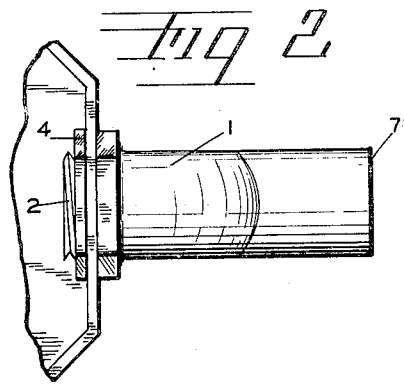
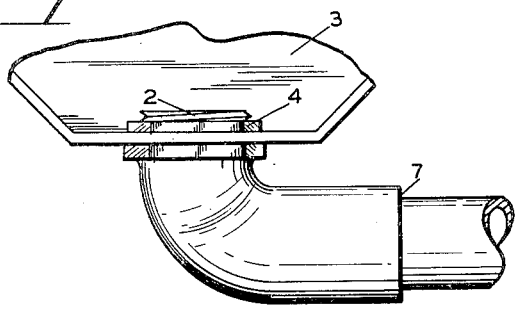
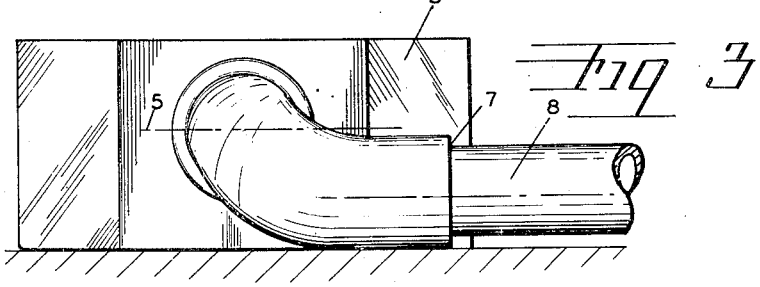
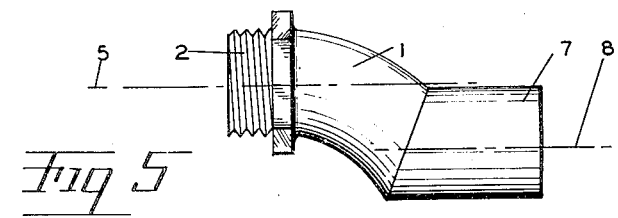
*INVENTOR.*
JAMES D. LANGMAN
BY *John Muirie*
ATTORNEY Patented Feb. 14, 1950

2,497,126

UNITED STATES PATENT OFFICE 2,497,126

ELECTRIC CONDUIT FITTING

James D. Langman, Portland, Oreg., assignor to Associated Manufacturers and Distributors Corp., Multnomah County, Oreg., a corporation of Oregon Application January 22, 1948, Serial No. 3,793

2 Claims. (Cl. 285—6.5)

This invention relates to electric conduit fittings and more particularly to such fittings adapted for offsetting the connections between two conductor housings having offset openings, such as between an electric conduit and a terminal box.

Heretofore it has been necessary to bend electric conduit at terminal boxes in order to insert the end of the tubing into the box. This took considerable time, labor and equipment and consequently is a costly operation. Furthermore it is virtually impossible to make a plurality of bends exactly uniform or to bend some types of conduit tubing.

Therefore, it is the primary object of my invention to provide an offset fitting for connecting two conductor housings having offset openings, such as an electric conduit and a terminal box or the like.

It is another object of my invention to provide an electric conduit fitting having simplicity of design, economy of construction and efficiency in operation.

These and other incidental objects will be apparent in the drawings, specification and claims.

Referring to the drawings:

Figure 1 is a side view of a terminal box illustrating an electric conduit connected thereto by my new and improved offset fitting.

Figure 2 is a detail fragmentary plan view taken on line 2—2 of Figure 1.

Figure 3 is a side view of a terminal box illustrating my new and improved offset fitting in the form of an elbow.

Figure 4 is a detail plan view taken on line 4—4 of Figure 3.

Figure 5 is a side view of a preferred form of one of my new and improved offset fittings.

Referring more specifically to the drawings:

My offset fitting consists of a tubular body member or conduit element 1, having the usual threaded end 2 to be inserted into a conductor housing such as the terminal box 3. The end 2 is provided with an abutment, such as the usual flange, for engagement with the housing, and is locked in the housing in the usual manner by the locking nut 4. The center line of this end portion of the fitting is indicated at 5. The other end 7 of the fitting is adapted for connection with the other conductor housing such as the usual electric conduit 6 which is shown as entering the end portion 7 and secured therein as by a crimp. The centerline of the end portion 7 of the fitting is indicated at 8.

I do not wish to be limited to any method of connecting the conduit to the fitting, nor the fitting to the terminal box, or to any other types of conductor housings, as my invention resides in the fact that the center line 8 of the end portion 7 is offset from the center line 5 of the end portion 2, to accommodate offset openings in the conductor housings. This applies to straight on fittings, as well as elbows.

In Figures 3 and 4 I illustrate an elbow type of fitting which may comprise either right or left hand bends. I do not wish to be limited to the degree of offset nor the scale of manufacture as my invention is admirably adapted to conduits of the larger dimensions where the bending of the conduit requires considerable time and heavy equipment to accomplish the offset, but with my new and improved offset fitting installation is made relatively simple.

That which is claimed as new is:

1. A connector device for running electric conductors from a surface into a terminal box, mounted on said surface, which device comprises a tubular member having an outer end portion for receiving an electric conductor and lying against the surface and having a center line parallel with the surface, an inner threaded end portion for entry through the usual admission aperture of a terminal box, said inner end having an integral flange adjacent the threads, the inner end being spaced from the plane of the surface and having a centerline parallel therewith but in a plane spaced outwardly from that of the outer end centerline, an intermediate portion having a double bend and connecting said end portions, and a removable nut engaging the threaded end to clamp a box against the flange.

2. An electric fitting for running electric conductors between two conductor housings which are mounted on a surface and have conductor passage openings at different distances from the plane of the surface with one of the openings substantially adjacent the plane of the surface and the other of the openings spaced outwardly from the one opening and the plane of the surface, which fitting comprises a conduit element having one end portion for connection with one housing to receive an electric conductor through the opening therein, a second end portion extending in a different direction than the one end for entry through the opening in the other housing, said second end portion having integral abutment means and threads between said means and the end of said portion for receiving a threaded member to hold the housing against said means, and an intermediate portion having a double bend and connecting said end portions with said end portions offset and having their center lines lying in spaced parallel planes.

JAMES D. LANGMAN.

REFERENCES CITED

The following references are of record in the file of this patent:

UNITED STATES PATENTS

| Number | Name | Date |
|---|---|---|
| 834,684 | Sibley et al. | Oct. 30, 1906 |
| 1,037,200 | Brickerhoff | Sept. 3, 1912 |
| 1,706,079 | Sanders | Mar. 19, 1929 |
| 1,920,598 | Schirmer | Aug. 1, 1933 |
| 2,131,165 | Clements | Sept. 27, 1938 |